(12) United States Patent
Swanson et al.

(10) Patent No.: US 9,058,504 B1
(45) Date of Patent: Jun. 16, 2015

(54) ANTI-MALWARE DIGITAL-SIGNATURE VERIFICATION

(71) Applicant: Malwarebytes Corporation, San Jose, CA (US)

(72) Inventors: Douglas Stuart Swanson, Providence, RI (US); Richard Allan Winter, Longmont, CO (US)

(73) Assignee: Malwarebytes Corporation, San Jose, CA (US)

( * ) Notice: Subject to any disclaimer, the term of this patent is extended or adjusted under 35 U.S.C. 154(b) by 60 days.

(21) Appl. No.: 13/899,565

(22) Filed: May 21, 2013

(51) Int. Cl.
*H04L 29/06* (2006.01)
*G06F 21/62* (2013.01)

(52) U.S. Cl.
CPC .................................. *G06F 21/6218* (2013.01)

(58) Field of Classification Search
CPC .................................................. G06F 21/6218
USPC .......................................................... 726/30
See application file for complete search history.

(56) References Cited

U.S. PATENT DOCUMENTS

| | | | |
|---|---|---|---|
| 7,343,493 B2* | 3/2008 | Challener et al. | 713/193 |
| 2003/0061494 A1* | 3/2003 | Girard et al. | 713/189 |
| 2003/0188179 A1* | 10/2003 | Challener et al. | 713/193 |
| 2004/0003266 A1* | 1/2004 | Moshir et al. | 713/191 |
| 2004/0073806 A1* | 4/2004 | Zimmer | 713/189 |
| 2005/0154738 A1* | 7/2005 | Thomas et al. | 707/10 |
| 2006/0005034 A1* | 1/2006 | Willman et al. | 713/182 |
| 2006/0026676 A1* | 2/2006 | O'Donoghue | 726/22 |
| 2006/0075499 A1* | 4/2006 | Edwards et al. | 726/24 |
| 2006/0075502 A1* | 4/2006 | Edwards | 726/24 |
| 2006/0095965 A1* | 5/2006 | Phillips et al. | 726/22 |
| 2006/0168660 A1* | 7/2006 | Edwards et al. | 726/22 |
| 2006/0174338 A1* | 8/2006 | Winneg et al. | 726/16 |
| 2006/0174344 A1* | 8/2006 | Costea et al. | 726/24 |
| 2006/0206943 A1* | 9/2006 | Ellison et al. | 726/26 |
| 2006/0272021 A1* | 11/2006 | Marinescu et al. | 726/24 |
| 2007/0016953 A1* | 1/2007 | Morris et al. | 726/24 |
| 2007/0033419 A1* | 2/2007 | Kocher et al. | 713/193 |
| 2007/0180509 A1* | 8/2007 | Swartz et al. | 726/9 |
| 2007/0294756 A1* | 12/2007 | Fetik | 726/11 |
| 2008/0010684 A1* | 1/2008 | Edwards et al. | 726/24 |
| 2008/0016339 A1* | 1/2008 | Shukla | 713/164 |
| 2008/0040795 A1* | 2/2008 | Winneg et al. | 726/16 |
| 2008/0077592 A1* | 3/2008 | Brodie et al. | 707/9 |
| 2008/0077994 A1* | 3/2008 | Comlekoglu | 726/27 |

(Continued)

OTHER PUBLICATIONS

"Windows Authenticode Portable Executable Signature Format," Microsoft Corporation white paper, Mar. 21, 2008, 17 pages, can be retrieved at URL<http://msdn.microsoft.com/en-us/library/windows/hardware/gg463180.aspx>.

(Continued)

*Primary Examiner* — David Garcia Cervetti
(74) *Attorney, Agent, or Firm* — Fenwick & West LLP

(57) ABSTRACT

A self-protection application executes in kernel mode and manages access to processes and files related to an associated anti-malware application. The self-protection application monitors executing processes on the client device and detects the processes that are attempting to access files/processes related to the anti-malware software. These processes and files are verified by the self-protection application using digital signature authentication. Trusted processes such as those originating from the anti-malware software or other authorized programs are allowed access while other processes are restricted access.

17 Claims, 2 Drawing Sheets

(56) References Cited

U.S. PATENT DOCUMENTS

| | | | | |
|---|---|---|---|---|
| 2008/0092235 | A1* | 4/2008 | Comlekoglu | 726/22 |
| 2008/0127348 | A1* | 5/2008 | Largman et al. | 726/24 |
| 2008/0133938 | A1* | 6/2008 | Kocher et al. | 713/193 |
| 2008/0141349 | A1* | 6/2008 | Lyle et al. | 726/4 |
| 2008/0282350 | A1* | 11/2008 | Khilnani et al. | 726/24 |
| 2008/0282351 | A1* | 11/2008 | Khilnani et al. | 726/24 |
| 2009/0077383 | A1* | 3/2009 | de Monseignat et al. | 713/175 |
| 2009/0077664 | A1* | 3/2009 | Hsu et al. | 726/24 |
| 2009/0216729 | A1* | 8/2009 | Kester et al. | 707/3 |
| 2009/0320133 | A1* | 12/2009 | Viljoen et al. | 726/24 |
| 2010/0058432 | A1* | 3/2010 | Neystadt et al. | 726/1 |
| 2010/0088670 | A1* | 4/2010 | Paster | 717/106 |
| 2011/0067109 | A1* | 3/2011 | Costea et al. | 726/24 |
| 2011/0078796 | A1* | 3/2011 | Khilnani et al. | 726/24 |
| 2011/0167275 | A1* | 7/2011 | Niemela | 713/188 |
| 2011/0214186 | A1* | 9/2011 | Khilnani et al. | 726/24 |
| 2011/0255690 | A1* | 10/2011 | Kocher et al. | 380/210 |
| 2011/0264923 | A1* | 10/2011 | Kocher et al. | 713/189 |
| 2012/0110337 | A1* | 5/2012 | Murphey et al. | 713/182 |
| 2012/0260082 | A1* | 10/2012 | Bobzin | 713/100 |
| 2013/0086386 | A1* | 4/2013 | Murphey et al. | 713/176 |
| 2013/0145469 | A1* | 6/2013 | Kulkarni et al. | 726/24 |
| 2013/0145472 | A1* | 6/2013 | Ramabhatta et al. | 726/25 |
| 2013/0160126 | A1* | 6/2013 | Kapoor et al. | 726/24 |
| 2013/0191622 | A1* | 7/2013 | Sasaki et al. | 713/2 |
| 2013/0276119 | A1* | 10/2013 | Edwards | 726/24 |

OTHER PUBLICATIONS

"Code Signing Best Practices," Microsoft Corporation white paper, Jul. 25, 2007, 68 pages, can be retrieved at URL<http://msdn.microsoft.com/en-us/library/windows/hardware/gg487309.aspx>.

* cited by examiner

ANTI-MALWARE DIGITAL-SIGNATURE VERIFICATION

FIELD OF ART

The present disclosure is generally related to a malware detection application and more specifically to the protection of anti-malware files and processes through digital signature verification.

BACKGROUND

Malicious software, also known as malware, is software designed to perform a malicious task within a targeted computing device. For example, malware may be used to disrupt computer operations, gather sensitive information, or gain access to private information in these targeted computing devices. In order to safeguard against malware attacks, anti-malware software exists to detect, identify, and remove malware. Some malware is specifically designed to weaken or disable the protection provided by anti-malware software. If anti-malware software is weakened or disabled, then the computing device becomes particularly vulnerable to further malware attacks.

SUMMARY

A self-protection application manages access to files and processes associated with an anti-malware application. In an embodiment, the self-protection application is initialized in kernel mode of a client device. The self-protection application monitors processes executing on the client device. The self-protection application detects a process that is attempting to access files or processes associated with the anti-malware application. Based in part on a digital signature associated with the detected process, the self-protection application determines whether the detected process is a trusted process that originates from an application authorized to access a file or process associated with the anti-malware application. The self-protection application determines whether to allow the detected process access to the anti-malware application process or file based on whether the process is a trusted process. Based on the determining, the self-protection application allows the detected process access to the process or file associated with the anti-malware application.

BRIEF DESCRIPTION OF THE DRAWINGS

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A self-protection application executes in kernel mode and manages access to processes and files related to an associated anti-malware application. The self-protection application monitors executing processes on the client device and detects the processes that are attempting to access files/processes related to the anti-malware application. These processes and files are verified by the self-protection application using digital signature authentication. Trusted processes such as those originating from the anti-malware application or other authorized applications are allowed access, while access by other processes is restricted.

In contrast to conventional digital signature verification techniques which operate in user mode, the self-protection application instead performs digital signature verification in kernel mode of the operating system. This beneficially provides the self-protection application with wider access to hardware and memory resources and enables the self-protection application to more robustly detect, remove, and prevent malware from disabling the anti-malware application. Furthermore, operating in kernel mode allows the self-protection application to more effectively intercept all attempts to access files and processes related to the anti-malware application.

Figure 1:
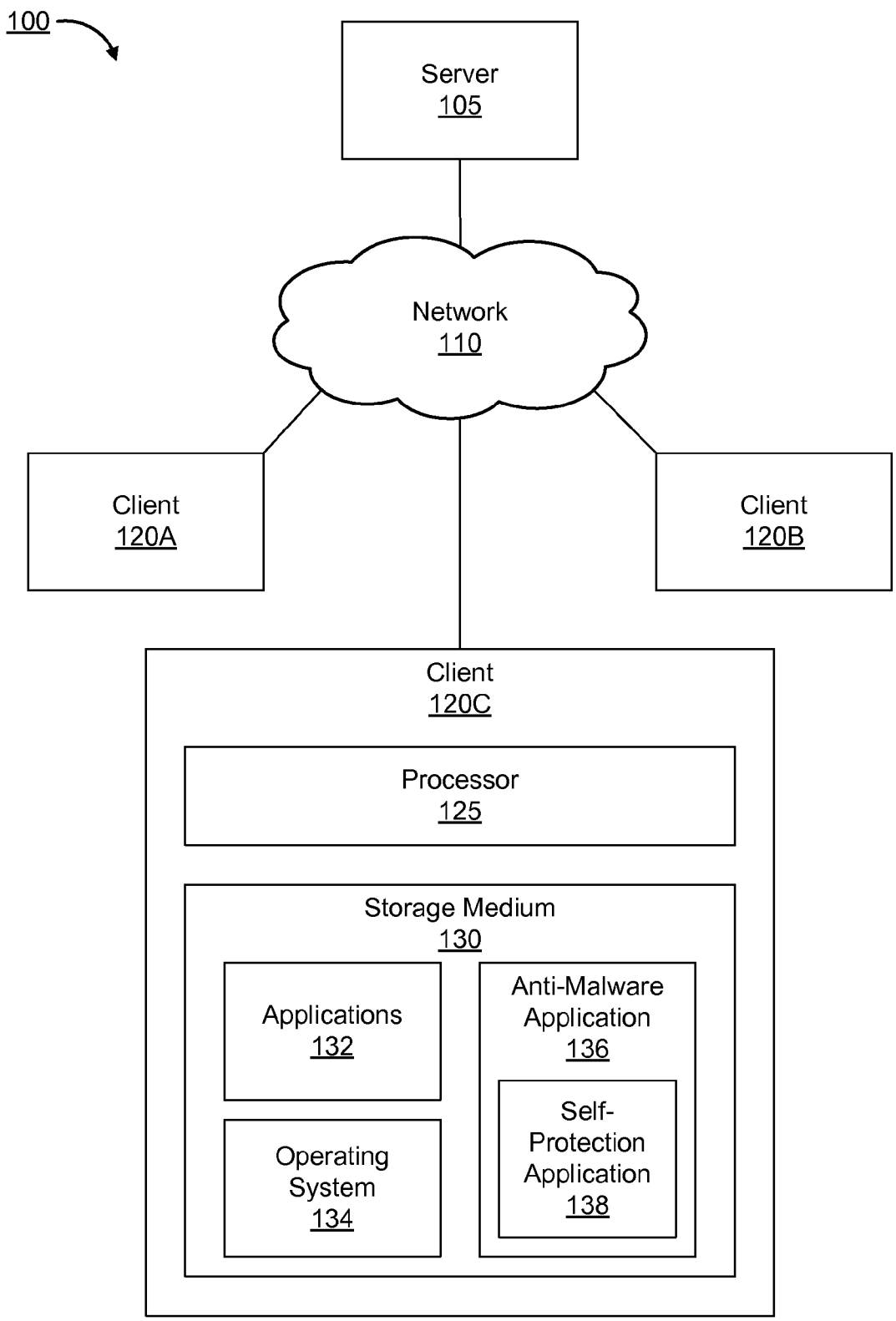
FIG. 1 is a high-level block diagram illustrating a system environment for an anti-malware self-protection application, in accordance to an embodiment.

FIG. 1 is a high-level block diagram illustrating a system environment 100 for an anti-malware self-protection application. The system environment 100 comprises a server 105, a network 110, and various clients 120A, 120B, 120C (collectively referenced herein as clients 120). For simplicity and clarity, only one server 105 and a limited number of clients 120 are shown; however, other embodiments may include different numbers of servers 105 and clients 120. Furthermore, the system environment 100 may include different or additional entities.

The server 105 is a computer system configured to store, receive, and transmit data to client devices 120 via network 110. The server 105 may include a singular computing system, such as a single computer, or a network of computing systems, such as a data center or a distributed computing system. In an embodiment, the server 105 is a content or data server providing information to a client 120. For example, the server 105 may be a website server that generates a user interface for users using clients 120 to browse. The server 105 may receive requests for data from clients 120 and respond by transmitting the requested data to the clients 120. In another embodiment, the server 105 may be data server for maintaining and updating applications on clients 120. The server 105 is also a potential source of malware that may infiltrate one or more clients 120. For example, as a user browses websites or downloads network files, malware embedded in the website or files may attempt to install itself on the client 120. Malware may thus be downloaded from the server 105 without the user's knowledge.

The network 110 represents the communication pathways between the server 105 and clients 120. In one embodiment, the network 110 is the Internet. The network 110 can also utilize dedicated or private communications links that are not necessarily part of the Internet. In one embodiment, the network 110 uses standard communications technologies and/or protocols. Thus, the network 110 can include links using technologies such as Ethernet, Wi-Fi (802.11), integrated services digital network (ISDN), digital subscriber line (DSL), asynchronous transfer mode (ATM), etc. Similarly, the networking protocols used on the network 110 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), long term evolution (LTE), code division multiple access 2000 (CDMA2000), and/or wide-band CDMA (WCDMA). The data exchanged over the network 110 can be represented using technologies and/or formats including the hypertext markup language (HTML), the extensible markup language (XML), the wireless access protocol (WAP), the short message service (SMS) etc. In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Each client 120 comprises one or more computing devices capable of processing data as well as transmitting and receiving data via a network 110. For example, a client device 120 may be a desktop computer, a laptop computer, a smart phone, a tablet computing device, or any other device having computing and data communication capabilities. Each client 120 includes a processor 125 for manipulating and processing data, and a storage medium 130 for storing data and program instructions associated with various applications. The storage medium 130 may include both volatile memory (e.g., random access memory) and non-volatile storage memory such as hard disks, flash memory, flash drives, external memory storage devices, USB drives, discs and the like. In addition to storing program instructions, the storage medium 130 stores various data associated with operation of the operating system 134, the anti-malware application 136, and other applications 132.

In one embodiment, the storage medium 130 comprises a non-transitory computer-readable storage medium. The various applications (e.g., the operating system 134, anti-malware application 136, self-protection application 138, and other applications 132) are each embodied as computer-executable instructions stored to the non-transitory computer-readable storage medium. The instructions, when executed by the processor 125, cause the client 120 to perform the functions attributed to the applications described herein. For example, when an application 132 executes, either in response to a user command or an automated script, the processor 125 accesses the application 132 in the storage medium 130 and creates a process. The processor 125 then executes the program instructions associated with the process or thread. This execution may include access to other files in the storage medium 130.

The operating system 134 is a specialized application that manages computer hardware resources of the client 120 and provides common services to applications 132. For example, a computer's operating system 134 may manage the processor 125 or other components not illustrated such as, for example, a storage medium, a graphics adapter, an audio adapter, network connections, disc drives, USB slots, and applications. A cell phone's operating system 134 may manage the processor 125, storage medium, display screen, keypad, dialer, wireless network connections and the like. Because many programs and executed processes compete for the limited resources provided by the processor 125, the operating system 134 may manage the processor bandwidth and timing to each requesting process. Examples of operating systems 134 include WINDOWS, MAC OS, IOS, LINUX, UBUNTU, UNIX, and ANDROID.

An anti-malware application 136 prevents, detects and removes malware such as, for example, viruses, malicious browser helper objects, hijackers, ransomware, keyloggers, backdoors, rootkits, Trojan horses, worms, malicious layered service providers, dialers, fraudtools, adware, spyware and so forth. The anti-malware application 136 may prevent new malware from being installed on a client 120 or remove or disable existing malware that is already present on the client 120. The anti-malware application 136 may perform detection by monitoring activities on the client 120 such that if a suspicious process, thread, or executable file starts, the anti-malware application 136 may flag the suspected process for further inspection. The anti-malware application 136 may also disable or remove files determined to be malware. The anti-malware application 136 may also access a related server 105 via the network 110 in order to download new malware definition files and use the files to update its outdated malware definition files. Files may also be downloaded from the server 105 to update the anti-malware application 136 and associated programs.

A weakness with conventional anti-malware systems is that the anti-malware application 136 itself may be vulnerable to malware attacks. If malware disables or weakens the anti-malware application 136, then the client 120 becomes even more vulnerable to malware attacks. To protect the anti-malware application 136, a self-protection application 138 prevents malware from removing, disabling, modifying, or otherwise interfering with the operation of the anti-malware application 136 unless the process originated from the anti-malware application 136 or another trusted entity. In an embodiment, the self-protection application 138 is a component of the anti-malware application 136 itself. In other embodiments, the self-protection application 138 executes independently from the anti-malware application 136 and is used to start a process that is able to defend the anti-malware application 136 against malware attacks. In one embodiment, the self-protection application 138 is furthermore able to protect the anti-malware application as it is being installed on a heavily-infected system. Once the anti-malware application is installed, the self-protection application 138 continues to protect the anti-malware application from further malware attacks. The self-protection application 138 also manages general access to the anti-malware application 136 process/files. For example, if an unauthorized process attempts to access the storage medium space allocated to the anti-malware application 136, the self-protection application 138 may block the access attempts.

In an embodiment, the self-protection application 138 executes in the kernel mode, rather than in the user mode, as a driver in a client 120. A driver that runs in kernel mode shares a single virtual address space with all other drivers running in kernel mode. A driver running in kernel mode also has complete and unrestricted access to the underlying hardware. Thus, it can execute any processor instruction or reference any memory. Kernel mode is often reserved for the most trusted functions of an operating system 134 because of the capabilities a driver has running in kernel mode. Because drivers running in kernel mode share a single address, any driver is able to change or overwrite another driver, code, process, or the operating system 134 itself. Furthermore, a crash, fault, or error in any single driver running in kernel mode will crash the entire client 120. Unlike kernel mode, user mode restricts a process from directly accessing hardware or reference memory. Any process requesting to access hardware or memory must delegate the task to a system's application programming interface (API). Each process running in user mode is isolated from other processes by being allocated a private virtual address space. Thus, a process running in user mode cannot modify data belonging to other processes and if one process crashes, the crash is limited to only that one process. By operating in kernel mode, the self-protection application 138 is able to gain access to all codes, drivers, and processes running on the client 120 and is able to more effectively detect all attempts to access processes or files associated with the anti-malware application 136. By running in kernel mode, the self-protection application 138 also has the ability to restrict access to any process it detects trying to access processes or files related to the anti-malware application 136. Furthermore, the self-protection application 138 is also able to take advantage of the increased performance offered by direct access to hardware and memory by running in kernel mode. Furthermore, Digital signature verification in user mode is very slow and is therefore impractical for scanning, detecting, and analyzing processes trying to access the anti-malware application 136 files or processes in real-time. Running in kernel mode allows the self-protection application 138 to more quickly operate on client 120.

In an embodiment, the self-protection application 138 comprises a digital signature verification system implemented in kernel mode of the operating system 134. Digital signatures are attached to applications and programs in order to identify the application's publisher, confirm the integrity of the application and verify that the application has not been modified since signing. Digital signatures identify application's publishers and also provide a mechanism that prevents tampering with the contents of the application. Digital signatures are discussed in further detail below with respect to FIG. 2. For example, in one embodiment, each process executing on the client 120 that is authorized to access files or processes related to the anti-malware application 136 is digitally signed by the publisher. Thus, for example, files and processes that are part of the anti-malware application 136 generally include such a signature that can be verified by the self-protection application 138. Additionally, certain files and processes outside of the anti-malware application 136 may be deemed trusted, and may also include such signatures that can be verified by the self-protection application 138. In one embodiment, the self-protection application 138 may periodically request and download updated signature files from a trusted server 105, such as the anti-malware application publisher's server, in order to have the newest set of digital signatures to verify against.

The digital signature verification system monitors the processes running on a client 120, verifies the authenticity of a process attempting to access processes/files related to the anti-malware application 136, and either allows or restricts access to the anti-malware application 136 code/process.

Various digital signatures are possible for ensuring the integrity of a piece of application. For example, digital signatures algorithms may use various encryption methods (e.g., cryptographic hash functions, asymmetric tokenization, encryption algorithms), digital certificates, public/private keys and so forth. In an embodiment, a digital signature is hashed using a hashing algorithm, producing the hash of data. A hash algorithm takes an arbitrary block of data as the basis for producing a fixed size bit string, which is known as the hash value. The cryptographic hash function/algorithm is a one-directional operation and is designed to be difficult to be reversed. Any changes in the original data will cause a different hash value to be produced, thus providing a way to verify whether a program has been modified. The hash is then signed with a private key, which is known only to the publisher or the owner of the private key. In an embodiment, the signed hash is then distributed along with the data to other users. A complementary public key can also be distributed to anyone through sources, such as a certificate authority, an online server, the publisher, the program itself and so forth, and can be used to verify the signature of the private key. In an embodiment, the self-protection application 138 acquires and stores a list of trusted public keys that are used to identify applications that come from trusted publishers. Code decrypted using a public key from this list of trusted public keys can be trusted to have come from a holder of the private key.

Digital certificates are often included in digital signatures in order to verify the origin of the signature. Certificates are usually issued by a certification authority that confirms the integrity of the certificate. By verifying the digital certificate issued with the digital signature, users may be able to confirm the origin of the program or application code. Digital certificates are often used to sign e-mail messages, establish secure communication protocols, or securely logging on to some computers. In an embodiment, the self-protection application 138 may acquire and store a list of trusted digital certificates that can be used to identify applications that come from trusted publishers.

The self-protection application 138, in an embodiment, identifies the publisher of a process or application and verifies that the process/application has not been modified since signing. In one embodiment, the self-protection application 138 utilizes at least one of digital signatures, cryptographic techniques, and trusted root certificates to verify identify. The signature that is read by the self-protection application 138 may be embedded in a portion of the program file that is nonexecutable in order to prevent the alteration of the executable portions of the file. Thus, if a signature is missing or incorrect from a program requesting access to the anti-malware application 136, the self-protection application 138 will restrict the requesting program access.

While FIG. 1 and the previous examples use anti-malware application 136 as the base program for a self-protection application 138, other embodiments may implement the self-protection application 138 in other types of applications, such as word processing applications, gaming applications, applets, browser clients and the like. A self-protection application 138 may manage process/file access to various types of applications and memory space in order to ensure the integrity of the applications running on client 120.

Kernel Mode Digital Signature Verification

Figure 2:
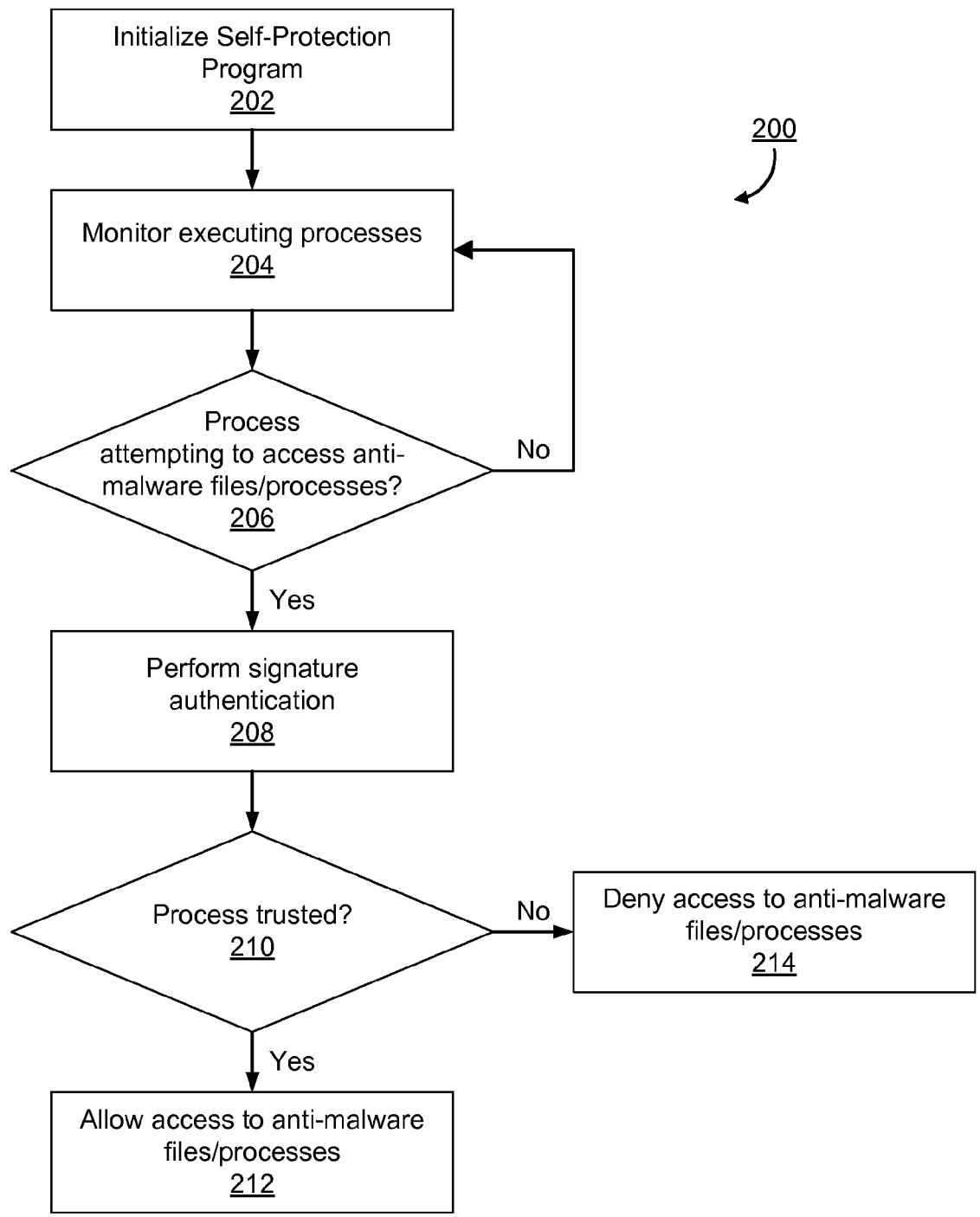
FIG. 2 is a flow diagram illustrating a process for detecting and authenticating processes attempting to interact with an anti-malware application, in accordance with an embodiment.

FIG. 2 is a flow diagram illustrating an embodiment of a process for detecting and authenticating processes attempting to access the anti-malware application. In an embodiment, the self-protection application 138 may be initiated 202 when the client 120 first starts up (e.g., along with other drivers during the start up process). This allows the self-protection application 138 to begin operating before applications 132 and other processes, including those related to malware, begin executing.

In the scenario that the anti-malware application 136 has not been installed on client 120 but an installation attempt is in progress, the self-protection application 138 may be initiated separately from the anti-malware application 136 or prior to the installation of the anti-malware application 136 as a means to protect the anti-malware application 136 installation from malware attacks. For example, when the anti-malware application 136 installer is initiated, the installer may load the self-protection application 138 into the client's storage medium and initialize 202 it under the kernel mode.

Once initiated 202, the self-protection application 138 monitors 204 each process that is executed by the client 120. Monitoring 204 may also involve the self-protection application 138 determining whether the process is requesting a type of access that should be flagged for further authentication. In an embodiment, a callback signal is generated by the operating system 134 when a new process is created. The self-protection application 138 registers the callback signal and analyzes the process and originating application. The self-protection application 138 may verify the digital signature of the originating application when the callback signal is received. If the digital signature is verified, the process is added to a list of trusted processes maintained by the self-protection application 138. This list of trusted processes may be used during the client's normal operations to determine whether attempts to access files or processes related to the anti-malware application 136 are authorized.

In another embodiment, the self-protection application 138 does not necessarily check the digital signature for each new process that is created, but instead only registers the process with the trusted list when a process tries to open, write or delete files, processes or registry keys related to the anti-malware application 136. The self-protection application 138 monitors 204 and filters processes executing on the client 120 through kernel APIs. When the self-protection application 138 detects a process that is executing on client 120, the application will determine 206 whether the process is attempting to access files or processes related to the anti-malware application 136. If the process is not attempting to access anti-malware files/processes at decision block 206, the self-protection application 138 continues monitoring 204 the executing processes. If the process is trying to access the anti-malware application 136 at decision block 206 or any related files/processes or is requesting a specific type of access, the self-protection application 138 may begin verifying the identity and integrity of the process. In an embodiment, the self-protection application 138 may perform 208 an authentication to determine whether the process is digitally signed and if it has the correct digital signature. This step 208 may be performed by checking whether the process is on the list of trusted processes previously determined to have a valid signature. Alternatively, step 208 may include performing a signature verification without relying on a previously created list of trusted processes. If the process is not digitally signed or has the incorrect signature at decision block 210 (e.g., because the process is not on a previously created trusted list or a signature verification fails), then the self-protection application 138 may automatically deny 214 it access to the anti-malware application 136 files and processes. This includes, for example, denying access to files, registries, processes, deleting files, replacing files and so forth. Otherwise, if the signature is determined to be trusted at step 210, the self-protection application 138 allows 212 access.

In an embodiment, performing 208 the authentication includes, for example, checking the validity of the signature (e.g., indicated publisher, timestamps, encryption methods, origin of process and the like). For example, the self-protection application 138 may keep a whitelist (e.g., whitelist of public keys, whitelist of digital certificates, whitelist of publishers and so forth) that are allowed to run processes that access the anti-malware application 136. If the process requesting access does not originate from a public key, digital certificate, and/or publisher listed on the whitelist, then the self-protection application 138 may deny 214 access before further authentication is performed. The self-protection application 138 may use the location of the expected digital signature as a determinant for whether a process is trusted 210.

In an embodiment, the self-protection application 138 may receive the public key corresponding to the program or application from which the process originated from. To verify that the code has not been tampered with in the interim between the publisher's releasing the program and the program running on client 120, the self-protection application 138 may extract the hash value that is packaged with the process program by using the acquired public key. The self-protection application 138 also uses the same hash function that the publisher used on the program's data to generate a hash value. The self-protection application 138 compares its independently generated hash value with the hash value decrypted using the public key. If the two hash values are identical, then the self-protection application 138 has determined that the process can be trusted 210 and allows 212 it access to anti-malware files or processes. If the two hash values differ, then there is a high probability that the process originates from malware or a program that has been tampered with. In this scenario, the process is not trusted 210 and the self-protection application 138 denies 214 the process access to the anti-malware files or processes.

Although hash value comparison is described as the method of signature authentication, other embodiments may utilize other methods of signature verification. For example, the self-protection application 138 may verify a program's digital certificates in order to allow or deny access to the anti-malware files or processes. In an embodiment, the digital certificates may be packaged along with the program that is generating a process requesting access to the anti-malware files or processes. The digital certificates are often contained within or as part of a digital signature. By comparing the extracted digital certificate and a digital certificate copy obtained from a certification authority, which manages and issues digital certificates to publishers, the self-protection application 138 may verify the identity of the program's publisher.

In an embodiment, the self-protection application 138 may also analyze the timestamps encoded into a program in determining whether a process is trusted 210. Digital certificates often expire after a period of time. However, programs and applications are designed to operate for many years, often surpassing the expiration date of the certificate. By analyzing the timestamp of a program, the self-protection application 138 can compare the timestamp with the period of time which the associated digital certificate attached to the program was valid. If the timestamp is within the period of validity, then the digital signature is valid. However, if the timestamp used is not within the period of validity for whatever reason, the self-protection application 138 determines the program to not be trusted.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, the self-protection application may be associated with applications other than an anti-malware application in other embodiments. The self-protection application may protect the associated application from external attacks from malware or any other unauthorized attempts to access a process or file.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for managing access to files and processes associated with an anti-malware application, comprising:
   initializing a self-protection application, the self-protection application comprising instructions executed by a processor of a client device, the self protection application executing in kernel mode of an operating system of the client device;
   monitoring one or more processes executing on the client device;
   detecting, by the self-protection application executing in kernel mode, a process that is attempting to access a file or process associated with the anti-malware application;
   verifying a digital certificate contained within a digital signature associated with the detected process by comparing the digital certificate with a digital certificate copy obtained from a certificate authority;
   verifying a timestamp of a program associated with the detected process by comparing the timestamp of the program to a period of validity associated with the digital certificate;
   determining, by the self-protection application executing in kernel mode, whether the detected process is a trusted process based in part on verifying that the digital certificate matches the digital certificate copy and verifying that the timestamp of the program associated with the detected process is within the period of validity associated with the digital certificate, wherein the trusted process originates from applications authorized to access a file or process associated with the anti-malware application;
   determining whether to allow the detected process based at least in part on whether the process is a trusted; and
   allowing the detected process access to the file or process associated with the anti-malware application subject to the determining.

2. The method of claim 1, further comprising:
   requesting one or more updated signature files associated with the self-protection application from a trusted server, the signature files comprising data associated with digital signatures;
   downloading the one or more updated signature files from the trusted server; and
   installing the one or more updated signature files into the self-protection application.

3. The method of claim 1, wherein the self-protection application is initialized on the client device prior to the installation of the anti-malware application.

4. The method of claim 1, wherein the digital signature identifies the publisher of an application associated with the detected process and the integrity of the application associated with the detected process.

5. The method of claim 1, wherein determining whether the detected process is a trusted process further comprises:
   receiving a public key complementing a private key associated with the detected process;
   extracting a first hash value from the digital signature using the public key;
   determining a second hash value by using a cryptographic hash algorithm on the data associated with the detected process; and
   comparing the first hash value and the second hash value.

6. The method of claim 1, further comprising denying the detected process access to the file or process associated with the anti-malware application under one or more of the following: no digital signature is associated with the detected process, the associated digital signature is invalid, the first hash value and the second hash value do not match, the associated digital signature indicates an unauthorized publisher, the origin of the process is not trusted or the timestamp associated with the digital signature is invalid.

7. A non-transitory computer-readable storage medium encoded with executable computer program code for managing access to files and processes associated with anti-malware application, the computer program code comprising program code for:

initializing a self-protection application executing in kernel mode of a client device;
monitoring one or more processes executing on the client device;
detecting, by the self-protection application executing in kernel mode, a process that is attempting to access a file or process associated with the anti-malware application;
verifying a digital certificate contained within a digital signature associated with the detected process by comparing the digital certificate with a digital certificate copy obtained from a certificate authority;
verifying a timestamp of a program associated with the detected process by comparing the timestamp of the program to a period of validity associated with the digital certificate;
determining, by the self-protection application executing in kernel mode, whether the detected process is a trusted process based in part on verifying that the digital certificate matches the digital certificate copy and verifying that the timestamp of the program associated with the detected process is within the period of validity associated with the digital certificate, wherein the trusted process originates from applications authorized to access a file or process associated with the anti-malware application;
determining whether to allow the detected process based at least in part on whether the process is a trusted process; and
allowing the detected process access to the file or process associated with the anti-malware application subject to the determining.

8. The non-transitory computer-readable storage medium of claim 7, further comprising:
requesting one or more updated signature files associated with the self-protection application from a trusted server, the signature files comprising data associated with digital signatures;
downloading the one or more updated signature files from the trusted server; and
installing the one or more updated signature files into the self-protection application.

9. The non-transitory computer-readable storage medium of claim 7, wherein the self-protection application is initialized on the client device prior to the installation of the anti-malware application.

10. The non-transitory computer-readable storage medium of claim 7, wherein determining whether the detected process is a trusted process further comprises:
receiving a public key complementing a private key associated with the detected process;
extracting a first hash value from the digital signature using the public key;
determining a second hash value by using a cryptographic hash algorithm on the data associated with the detected process; and
comparing the first hash value and the second hash value.

11. The non-transitory computer-readable storage medium of claim 7, further comprising denying the detected process access to the file or process associated with the anti-malware application under one or more of the following: no digital signature is associated with the detected process, the associated digital signature is invalid, the first hash value and the second hash value do not match, the associated digital signature indicates an unauthorized publisher, the origin of the process is not trusted or the timestamp associated with the digital signature is invalid.

12. A system for managing access to files and processes associated with an anti-malware application, the system comprising:
a processor;
a computer-readable storage medium storing executable instructions that when executed cause the process to perform steps including:
initializing the self-protection application executing in kernel mode of a client device;
monitoring one or more processes executing on the client device;
detecting, by the self-protection application executing in kernel mode, a process that is attempting to access a file or process associated with the anti-malware application;
verifying a digital certificate contained within a digital signature associated with the detected process by comparing the digital certificate with a digital certificate copy obtained from a certificate authority;
verifying a timestamp of a program associated with the detected process by comparing the timestamp of the program to a period of validity associated with the digital certificate;
determining, by the self-protection application executing in kernel mode, whether the detected process is a trusted process based in part on verifying that the digital certificate matches the digital certificate copy and verifying that the timestamp of the program associated with the detected process is within the period of validity associated with the digital certificate, wherein the trusted process originates from applications authorized to access a file or process associated with the anti-malware application;
determining whether to allow the detected process based at least in part on whether the process is a trusted process; and
allowing the detected process access to the file or process associated with the anti-malware application subject to the determining.

13. The system of claim 12, further comprising:
requesting one or more updated signature files associated with the self-protection application from a trusted server, the signature files comprising data associated with digital signatures;
downloading the one or more updated signature files from the trusted server; and
installing the one or more updated signature files into the self-protection application.

14. The system of claim 12, wherein the self-protection program is initialized on the client device prior to the installation of the anti-malware application.

15. The system of claim 12, wherein the digital signature identifies the publisher of an application associated with the detected process and the integrity of the application associated with the detected process.

16. The system of claim 12, wherein determining whether the detected process is a trusted process further comprises:
receiving a public key complementing a private key associated with the detected process;
extracting a first hash value from the digital signature using the public key;
determining a second hash value by using a cryptographic hash algorithm on the data associated with the detected process; and
comparing the first hash value and the second hash value.

17. The system of claim 12, further comprising denying the detected process access to the file or process associated with the anti-malware application under one or more of the following: no digital signature is associated with the detected process, the associated digital signature is invalid, the first hash value and the second hash value do not match, the associated digital signature indicates an unauthorized publisher, the origin of the process is not trusted or the timestamp associated with the digital signature is invalid.

\* \* \* \* \*

UNITED STATES PATENT AND TRADEMARK OFFICE
CERTIFICATE OF CORRECTION

| | | |
|---|---|---|
| PATENT NO. | : 9,058,504 B1 | Page 1 of 1 |
| APPLICATION NO. | : 13/899565 | |
| DATED | : June 16, 2015 | |
| INVENTOR(S) | : Swanson et al. | |

It is certified that error appears in the above-identified patent and that said Letters Patent is hereby corrected as shown below:

Title Page, Item (72) Inventors, should read

-- (72) Inventors: Douglas Stuart Swanson, Providence, RI (US); Richard Allan Winter, Longmont, CO (US); Arif Gezalov, Boulder, CO (US) --.

Signed and Sealed this
First Day of December, 2015

Michelle K. Lee
*Director of the United States Patent and Trademark Office*